(12) United States Patent
Haidet et al.

(10) Patent No.: US 11,958,260 B2
(45) Date of Patent: Apr. 16, 2024

(54) TIRE WITH VARIABLE SHEAR ELEMENT

(71) Applicant: Bridgestone Americas Tire Operations, LLC, Nashville, TN (US)

(72) Inventors: Andrew V. Haidet, Silver Lake, OH (US); Douglas B. Costlow, Akron, OH (US); Robert W. Asper, Wadsworth, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 91 days.

(21) Appl. No.: 17/509,625

(22) Filed: Oct. 25, 2021

(65) Prior Publication Data

US 2022/0040943 A1 Feb. 10, 2022

Related U.S. Application Data

(62) Division of application No. 16/061,195, filed as application No. PCT/US2016/067668 on Dec. 20, 2016, now Pat. No. 11,186,053.

(Continued)

(51) Int. Cl.
*B29D 30/02* (2006.01)
*B29D 30/00* (2006.01)
(Continued)

(52) U.S. Cl.
CPC ............ *B29D 30/02* (2013.01); *B29D 30/70* (2013.01); *B60C 7/08* (2013.01); *B60C 7/143* (2013.01);
(Continued)

(58) Field of Classification Search
CPC ............ B60C 7/22; B60C 7/143; B60C 7/146
(Continued)

(56) References Cited

U.S. PATENT DOCUMENTS 1,447,784 A 3/1923 Hulse
1,911,524 A 5/1933 Nalinne
(Continued)

FOREIGN PATENT DOCUMENTS

CN 106163832 11/2016
DE 915782 C * 7/1954
(Continued)

OTHER PUBLICATIONS

Fauner, DE915782C, Machine Translation, 1954 (Year: 2023).*
(Continued)

*Primary Examiner* — Katelyn W Smith
*Assistant Examiner* — Alexander D Booth
(74) *Attorney, Agent, or Firm* — Shaun J. Fox; Bryan J. Jaketic

(57) ABSTRACT

A tire includes a central region configured to be mounted to a wheel and a crown region including a circumferential tread and a shear element disposed below the circumferential tread. The shear element includes an upper reinforcement layer, a lower reinforcement layer, and an elastic region disposed between the upper reinforcement layer and the lower reinforcement layer. A radial distance between the upper reinforcement layer and the lower reinforcement layer varies along an axial width of the tire. The tire also includes an intermediate region extending from the central region to the crown region.

15 Claims, 7 Drawing Sheets

Related U.S. Application Data

(60) Provisional application No. 62/272,153, filed on Dec. 29, 2015.

(51) Int. Cl.

| | | |
|---|---|---|
| *B29D 30/20* | (2006.01) | |
| *B29D 30/70* | (2006.01) | |
| *B60C 7/08* | (2006.01) | |
| *B60C 7/10* | (2006.01) | |
| *B60C 7/14* | (2006.01) | |
| *B60C 7/22* | (2006.01) | |
| *B60C 9/18* | (2006.01) | |
| *B60C 9/22* | (2006.01) | |

(52) U.S. Cl.
CPC .................. *B60C 7/22* (2013.01); *B60C 9/18* (2013.01); *B60C 9/22* (2013.01); *B60C 9/2204* (2013.01); *B29D 2030/0083* (2013.01); *B29D 2030/201* (2013.01); *B60C 7/107* (2021.08); *B60C 7/146* (2021.08)

(58) Field of Classification Search
USPC ......................................................... 156/112
See application file for complete search history.

(56) References Cited

U.S. PATENT DOCUMENTS

| | | | |
|---|---|---|---|
| 2,245,444 A | 6/1941 | Ross | |
| 2,264,767 A | 12/1941 | Ofensend | |
| 4,287,927 A | 9/1981 | Caravito | |
| 4,934,429 A | 6/1990 | Koseki et al. | |
| 5,676,900 A | 10/1997 | Pajtas | |
| 6,279,630 B1 | 8/2001 | Ims | |
| 7,032,634 B2 | 4/2006 | Laurent et al. | |
| 7,143,797 B2 | 12/2006 | Vannan | |
| 8,104,524 B2 | 1/2012 | Manesh et al. | |
| 8,491,981 B2 | 7/2013 | Delfino et al. | |
| 8,851,131 B2 | 10/2014 | Luchini et al. | |
| 8,883,283 B2 | 11/2014 | Delfino et al. | |
| 8,962,120 B2 | 2/2015 | Delfino et al. | |
| 2003/0121581 A1* | 7/2003 | Thompson | .............. B60C 17/00 152/197 |
| 2006/0113016 A1 | 6/2006 | Cron | |
| 2009/0107596 A1 | 4/2009 | Palinkas | |
| 2010/0200131 A1 | 8/2010 | Masanori et al. | |
| 2011/0024008 A1 | 2/2011 | Manesh et al. | |
| 2011/0079335 A1 | 4/2011 | Manesh | |
| 2011/0214789 A1 | 9/2011 | Cress et al. | |
| 2012/0038206 A1 | 2/2012 | Chadwick et al. | |
| 2012/0060991 A1 | 3/2012 | Mun et al. | |
| 2013/0319591 A1 | 12/2013 | Van De Wiele | |
| 2014/0000777 A1 | 1/2014 | Choi et al. | |
| 2014/0238561 A1 | 8/2014 | Choi et al. | |
| 2014/0353862 A1 | 12/2014 | Erdman | |
| 2015/0034225 A1 | 2/2015 | Martin | |
| 2015/0053324 A1 | 2/2015 | Lee et al. | |
| 2015/0122382 A1 | 5/2015 | Choi et al. | |
| 2015/0174954 A1 | 6/2015 | Asper | |
| 2015/0251498 A1 | 9/2015 | Thompson | |
| 2016/0016433 A1 | 1/2016 | Amstutz | |
| 2017/0113491 A1* | 4/2017 | Iwamura | .............. B60C 11/0041 |

FOREIGN PATENT DOCUMENTS

| | | |
|---|---|---|
| DE | 102012211450 | 1/2014 |
| EP | 1754615 | 6/2006 |
| GB | 169320 | 9/1921 |
| JP | H05147044 | 6/1993 |
| JP | 2011219009 | 11/2011 |
| KR | 1020130073362 | 7/2013 |
| KR | 20150129140 | 11/2015 |
| WO | 9425297 | 11/1994 |
| WO | 02083435 | 10/2002 |
| WO | 2014183890 | 11/2014 |
| WO | 2015187394 | 12/2015 |

OTHER PUBLICATIONS

Search Report and Written Opinion; Corresponding PCT application Serial No. PCT/US2016/067668; dated Mar. 17, 2017; Authorized Officer Lee, Myun Jin.

Tolentino, Melissa; Bridgestone's non-pneumatic tires; URL: http://siliconangle.com/blog/2013/11/20/3d-printed-car-to-traverse-us-roads-in-2-years/; Nov. 20, 2013.

3D Printing a Rubber Tire with Flex EcoPLA at MakerGeeks.com; MakerGeeks, URL: https://www.youtube.com/watch?v=E5x8BMdATBc; Jun. 22, 2013.

* cited by examiner

TIRE WITH VARIABLE SHEAR ELEMENT

CROSS-REFERENCE TO RELATED APPLICATIONS

This application is a divisional of U.S. patent application Ser. No. 16/061,195, filed on Jun. 11, 2018, which in turn is a national stage entry of PCT/US16/67668, filed on Dec. 20, 2016, which in turn claims the benefit of priority of U.S. Provisional Application No. 62/272,153, filed on Dec. 29, 2015. Each of these documents is incorporated herein by reference in its entirety.

FIELD OF INVENTION

The present disclosure is directed to a tire having a shear element and a method of making the same. More particularly, the present disclosure is directed to a tire having a shear element of varying dimensions.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. One such type of run flat tire incorporates a thin annular high strength band element which acts as a tension member when the tire is pressurized and acts as a structural compression member when the tire is in the unpressurized or partially pressurized state.

SUMMARY OF THE INVENTION

In one embodiment, a tire has a central region configured to be mounted to a wheel, and a crown region that includes a circumferential tread and a shear element disposed below the circumferential tread. The shear element includes an upper reinforcement layer, a lower reinforcement layer, and an elastic region disposed between the upper reinforcement layer and the lower reinforcement layer. A radial distance between the upper reinforcement layer and the lower reinforcement layer varies along an axial width of the tire. An intermediate region extends from the central region to the crown region.

In another embodiment, a tire has a central region configured to be mounted to a wheel, and a crown region that includes a circumferential tread, a plurality of lower rings, and a plurality of upper rings. At least one of the plurality of lower rings and the plurality of upper rings has rings with different diameters. An intermediate region extends from the central region to the crown region.

In yet another embodiment, a tire has a central region configured to be mounted to a wheel, and a crown region that includes a shear element disposed below the circumferential tread. The shear element has a radial thickness that varies along an axial width of the tire. An intermediate region extends from the central region to the crown region.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
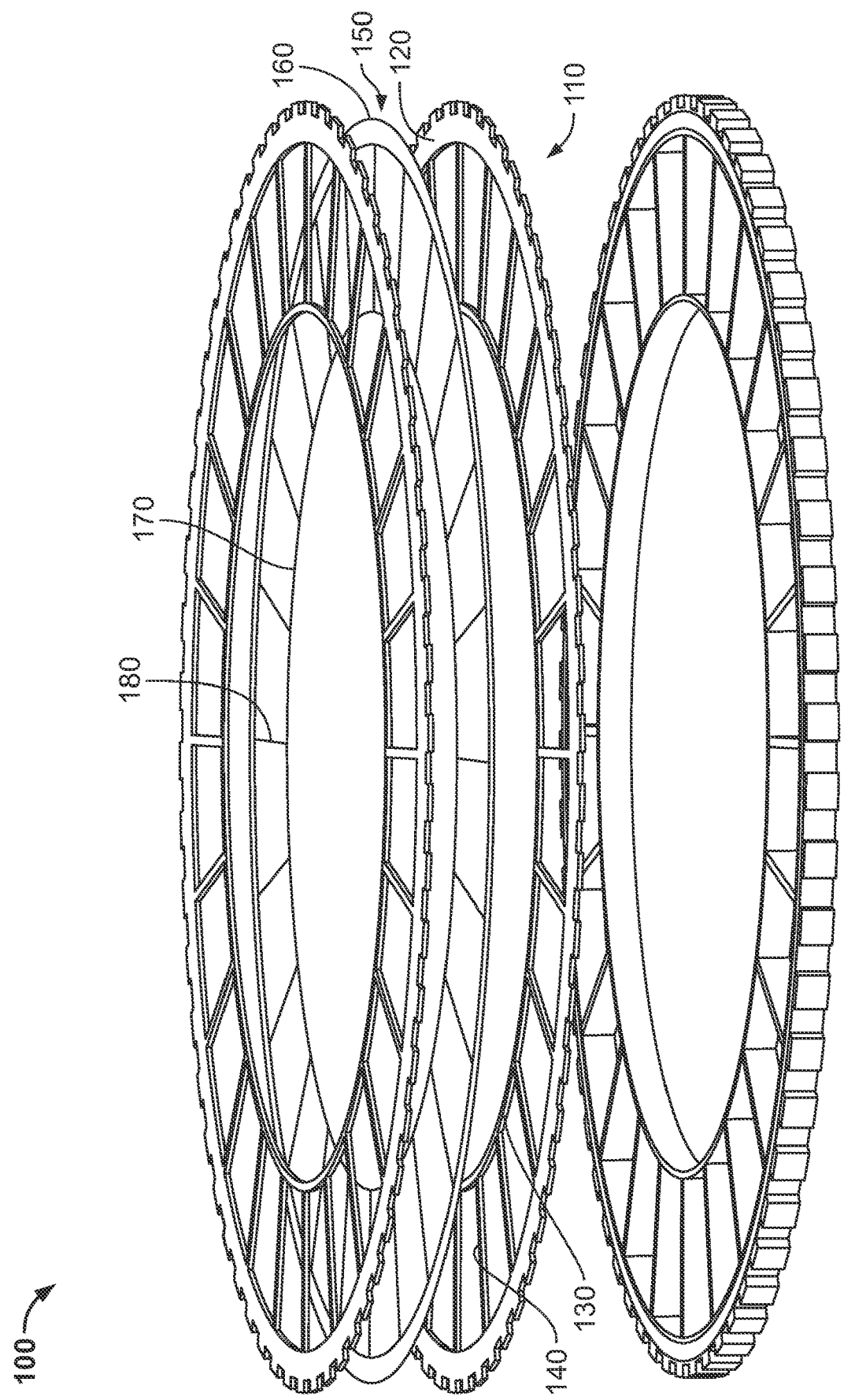
FIG. 1 illustrates an exploded view of one embodiment of a partially assembled non-pneumatic tire.

The following includes definitions of selected terms employed herein. The definitions include various examples and/or forms of components that fall within the scope of a term and that may be used for implementation. The examples are not intended to be limiting. Both singular and plural forms of terms may be within the definitions.

"3D printer" refers to a machine used for 3D printing.

"3D printing" refers to the fabrication of objects through the deposition of a material using a print head, nozzle, or another printer technology.

"Additive manufacturing" refers to a process of joining materials to make objects from 3D model data, usually layer upon layer, as opposed to subtractive manufacturing methodologies. Additive manufacturing includes 3D printing, binder jetting, directed energy deposition, fused deposition modeling, laser sintering, material jetting, material extrusion, powder bed fusion, rapid prototyping, rapid tooling, sheet lamination, and vat photopolymerization.

"Additive systems" refer to machines used for additive manufacturing.

"Axial" and "axially" refer to a direction that is parallel to the axis of rotation of a tire.

"Bead" refers to the part of the tire that contacts a wheel and defines a boundary of the sidewall.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" refers to that portion of the tire between the tread and the bead.

"Spoke" refers to one or more bars, rods, webbing, mesh, or other connecting member extending from a lower member to an upper member. A spoke may include a solid sheet of material.

"Subtractive manufacturing" refers to making objects by removing of material (for example, buffing, milling, drilling, grinding, carving, cutting, etc.) from a bulk solid to leave a desired shape, as opposed to additive manufacturing.

"Tread" as used herein, refers to that portion of the tire that comes into contact with the road or ground under normal inflation and normal load.

"Tread width" refers to the width of the ground contact area of a tread which contacts with road surface during the rotation of the tire under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it is understood that because the terms carry slightly different connotations, one of ordinary skill in the art would not consider any one of the following terms to be purely interchangeable with another term used to describe a common tire component.

FIG. 1 illustrates an exploded view of one embodiment of a partially assembled non-pneumatic tire 100. The non-pneumatic tire 100 includes a plurality of sheets of polymeric material 110 having a substantially circular shape. In this particular embodiment, each sheet of polymeric material includes an upper ring 120, a lower ring 130, and a plurality of spoke portions 140 extending from the upper ring 120 to the lower ring 130. In an alternative embodiment (not shown), not every sheet of polymeric material includes an upper ring, a lower ring, and a plurality of spoke portions. In one such example, some sheets include an upper ring, a lower ring, and a plurality of spoke portions, while other sheets omit the spoke portion or the lower ring. In another example, some sheets omit the upper ring.

In the illustrated embodiment, the upper ring 120 of each sheet includes a tread portion. The tread portion is shaped to form a tread design. In the illustrated embodiment, the tread portion forms a tread design having a plurality of rectangular tread blocks separated by a plurality of lateral grooves. In alternative embodiments (not shown), the tread portion may form a tread design having ribs, circumferential grooves, sipes, or tread blocks of various shapes and sizes. The tread may be symmetric or asymmetric.

In the illustrated embodiment, each sheet of polymeric material includes 24 spoke portions. In alternative embodiments, each sheet of polymeric material may have any number of spoke portions. In some examples, each sheet of polymeric material has 10-40 spoke portions.

In the illustrated embodiment, each sheet of polymeric material 110 has the same number of spoke portions 140. Additionally, each spoke portion 140 in each sheet 110 has substantially the same shape and size. Further, the spoke portions 140 of adjacent sheets 110 are aligned with each other. However, it should be understood that in alternative embodiments, some sheets may have a different number of spoke portions. Additionally, in other alternative embodiments, the sizes and shapes of the spoke portions on a given sheet may vary. Likewise, in still other alternative embodiments, the spoke portions on a given sheet may have different sizes and shape with respect to the spoke portions on another sheet. Moreover, the spoke portions of different sheets may not be aligned with each other.

In one embodiment, each sheet of polymeric material is constructed of green rubber. In an alternative embodiment, each sheet of polymeric material is constructed of cured rubber. In alternative embodiments, the sheet of polymeric material may be constructed of a foamed polymer, polyurethane, thermoplastics, resins, other elastomeric or polymeric material, other synthetic or natural fibers, and other metal materials. In another alternative embodiment, the sheet is formed of metal instead of a polymeric material. In one embodiment, each sheet is made of a uniform material. In an alternative embodiment, each sheet is constructed of a plurality of different materials. For example, the tread portion, upper ring, lower ring, and spokes may be constructed of different materials. Additionally, different sheets may be constructed of different materials. In any of the above embodiments, adhesive may be employed between sheets of material.

In one embodiment, each sheet of polymeric material is formed by an additive manufacturing method. For example, each sheet may be made by 3D printing, binder jetting, directed energy deposition, fused deposition modeling, laser sintering, material jetting, material extrusion, powder bed fusion, rapid prototyping, rapid tooling, sheet lamination, or vat photopolymerization. A jig or other fixture may be employed to aid in the assembly of multiple sheets to ensure proper orientation of each sheet. Alternatively, a jig or fixture may help define the shape of an individual sheet during the additive manufacturing process.

In an alternative embodiment, each sheet of polymeric material is formed by a subtractive manufacturing method. For example, the sheet of polymeric material may be cut (such as with a die, knife, or laser). Where a subtractive process is used, the sheet may be shaped before it is placed on top of the other sheets. Alternatively, the sheet may be only partially formed before it is placed on top of the other sheets, and then cut to its final shape after placement. Such a process would obviate the need for exactly placement of the sheet.

In another alternative embodiment, each sheet of polymeric material is formed by a molding process.

In one embodiment, each sheet of polymeric material 110 has a thickness of about 2 mm (0.080 inches). In alternative embodiments, each sheet of polymeric material may have a thickness between 0.02 mm to 25.4 mm (0.001 inches to 1 inch). In one embodiment, each sheet of polymeric material in the tire has substantially the same thickness. In alternative embodiments, the thickness of the sheets may vary. For example, thicker or thinner sheets may be used at different locations to change the spacing or placement of a reinforcement. It should be understood that in an additive manufacturing process, the sheets may not be visibly distinct from each other and thus they may not have a discernible thickness.

With continued reference to FIG. 1, the non-pneumatic tire 100 further includes a plurality of reinforcements 150, with each reinforcement 150 being disposed between adjacent sheets of polymeric material 110. In the illustrated embodiment, the reinforcement 150 is a plurality of cords forming a pair of upper rings 160, a lower ring 170, and a plurality of spoke reinforcements 180. The cords may also be referred to as wires or filaments. The upper rings 160 of the reinforcement 150 are sandwiched between the upper rings 120 of adjacent sheets of polymeric material 110. Likewise, the lower ring 170 of the reinforcement 150 is sandwiched between the lower rings 130 of adjacent sheets of polymeric material 110. Additionally, the spoke reinforcements 180 are sandwiched between the spoke portions 140 of adjacent sheets of polymeric material 110.

The pair of upper rings 160 of the reinforcement 150 are positioned such that when the tire 100 is cured, the upper rings 160 of the reinforcement 150 form a shear element defined by the upper pair of rings 120 of the sheets of polymeric material 110. In other words, a portion of the upper rings 120 of the polymeric material 110 is an elastic material disposed radially between the substantially inelastic membranes formed by the pair of upper rings 160 of the reinforcement 150.

However, it should be understood that the shape of the reinforcement 150 shown in FIG. 1 is merely exemplary. In alternative embodiments, some or all of the upper rings 160 of the reinforcement 150 may be omitted. Likewise, some or all of the lower rings 170 of the reinforcement 150 may be omitted. Additionally, some or all of the spoke reinforcements 180 may be omitted. In other alternative embodiments, multiple reinforcements may be employed on some portions. While the reinforcements are continuous components in the illustrated embodiment, it should be understood that the reinforcements may be discontinuous. For example, the reinforcements may be chopped fibers that are distributed along portions of a polymeric sheet.

The reinforcement 150 may be constructed of a material selected from the group consisting of steel, polyester, nylon, carbon fiber, aramid, fiber glass, cotton, hemp, polyurethane and other plastic, other synthetic or natural fibers, and other metal materials. While the reinforcement 150 is shown as a plurality of cords in FIG. 1, in alternative embodiments, the reinforcement is a mesh of material or a sheet of material. In another alternative embodiment, the reinforcement may be chopped fibers.

To construct the non-pneumatic tire 100, the method includes forming a first sheet of polymeric material 110 having a substantially circular shape. The first sheet of polymeric material 110 may be formed using any of the methods described above. The first sheet of polymeric material 110 may be formed on a flat surface, or it may be formed on a jig or fixture.

The method then includes placing a reinforcement 150 on the first sheet of polymeric material 110. In one embodiment, the reinforcement 150 has a preformed shape before it is placed on the first sheet of polymeric material 110. In an alternative embodiment, the reinforcement 150 may be shaped as it is being placed on the first sheet of polymeric material 110. For example, the reinforcement may be extruded or 3D printed onto the first sheet of polymeric material 110.

The method further includes placing a second sheet of polymeric material having a substantially circular shape on the first sheet of polymeric material, such that the reinforcement 150 is sandwiched between the first sheet of polymeric material and the second sheet of polymeric material. The method is then repeated, so that additional reinforcements and additional sheets of polymeric material are placed on top of each other until a tire is built having a predetermined width. In other words, the tire is built in a direction perpendicular to the axis of rotation of the tire, and the number of layers and their width determines the width of the tire. In one embodiment, the tire has a width of 190 mm (7.5 inches). In other embodiments, the tire has a width of 12.5 mm to 1525 mm (0.5 inches to 60 inches). A tire having a plurality of layers in the axial direction may be referred to as a composite layer tire.

In one embodiment, adhesive or cement may be applied to a sheet of polymeric material before or after the reinforcement is placed on it. Additionally, additives or chemical treatment may be selectively applied to the polymeric sheets or to the reinforcements during the build process. Further, some sheets of polymeric material may have a contoured surface or a roughened surface to promote adhesion. For example, a sheet of polymeric material may go through a roughening process after it is placed on the tire.

While FIG. 1 shows alternating layers of polymeric sheets and reinforcements, it should be understood that several layers of polymeric sheets may be placed together or several layers of reinforcements may be placed together. It should also be understood that the reinforcements may vary on different layers. For example, a lower ring reinforcement may be placed on a first sheet, a pair of upper ring reinforcements may be placed on a second sheet, and spoke reinforcements may be placed on a third sheet.

After the tire 110 is built, it is then cured. In one embodiment, the tire is cured in a vulcanization mold. When the tire is cured in a vulcanization mold, the outer surfaces of the tire may be further shaped during vulcanization. In an alternative embodiment, the tire is cured in an autoclave. An autoclave may cure the tire at lower pressures than a typical vulcanization mold, thereby allowing the tire to maintain its shape. In yet another embodiment, the tire may be cured between metal plates of other materials. In still another embodiment, the curing step may be omitted.

Figure 2:
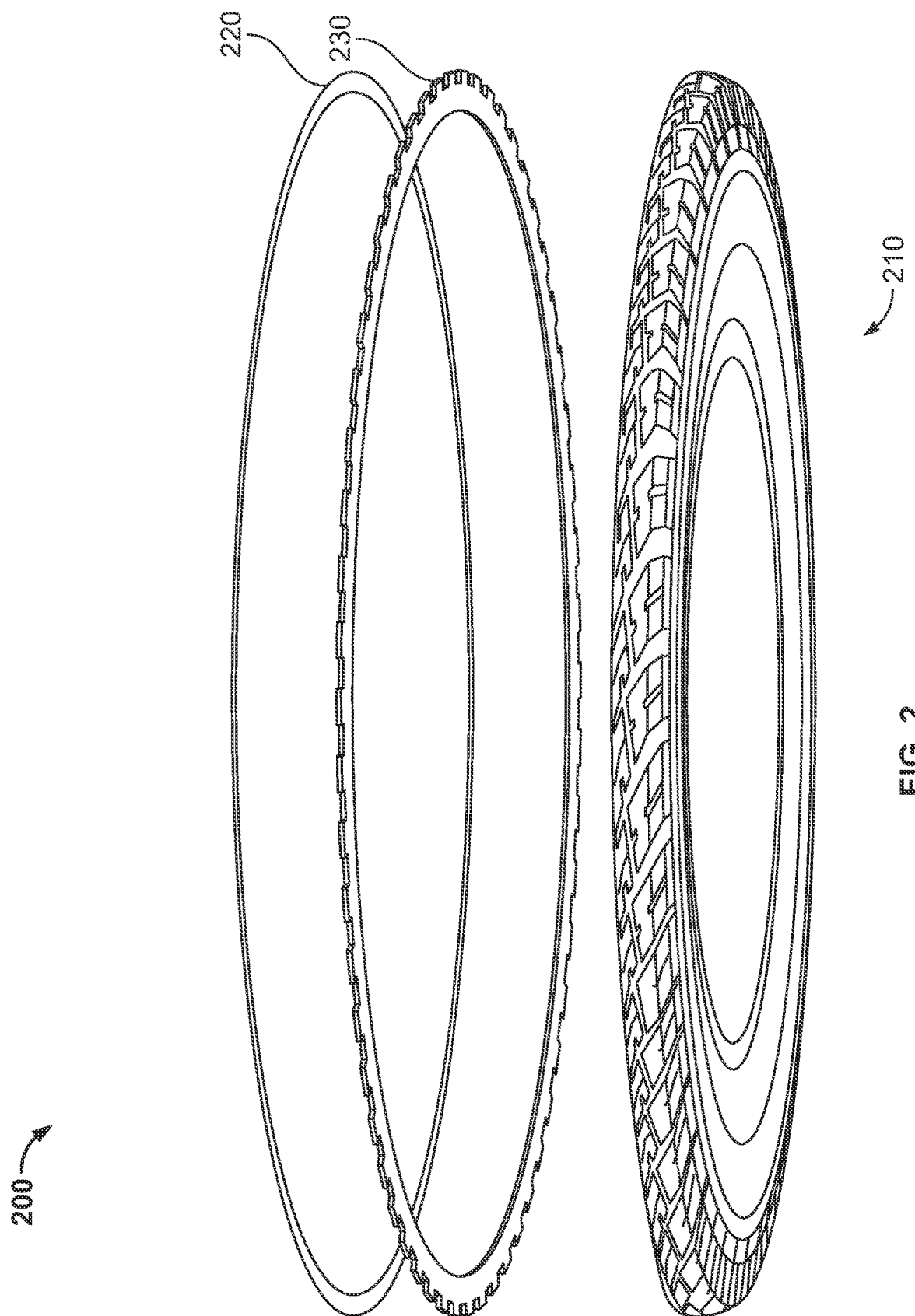
FIG. 2 illustrates an exploded view of one embodiment of a partially assembled pneumatic tire.

FIG. 2 illustrates an exploded view of one embodiment of a partially assembled pneumatic tire 200. The pneumatic tire 200 may be assembled using the same composite layer method described above. However, instead of spokes, the method is used to build bead portions (not shown), sidewalls 210, and a tread 220 of the tire. Additionally, the method may be used to build sidewall reinforcement layers (not shown) and crown region reinforcements 230. In the illustrated embodiment, the crown region reinforcements 230 are a pair of rings that define a shear element. The crown region may also include reinforcements that define circumferential belts or cap plies, instead of or in addition to the shear element.

After the green tire 200 is assembled it is cured in a vulcanization mold or an autoclave.

In both the pneumatic and non-pneumatic examples, electronics may be embedded into layers of the tire. For example, an RFID may be embedded in the tire. A conductive filament or material could be run through spokes or around other portions of the tire to allow for the detection of damage to the tire. For example, if a spoke is torn there would no longer be a conductive path and this could be sensed by the electronics in the tire. Conductive filaments may also be embedded in certain portions of the tire to aid in the discharge of static electricity that may build up as the tire rotates.

Many variations of composite layer tires are possible, for both pneumatic and non-pneumatic tires. For example, the type of material used as reinforcement may be selected to optimize the weight, stiffness, and other characteristics of the tire under various conditions. Likewise, the amount and location of the reinforcement may also be selected to optimize characteristics of the tire under various conditions.

Figure 3:
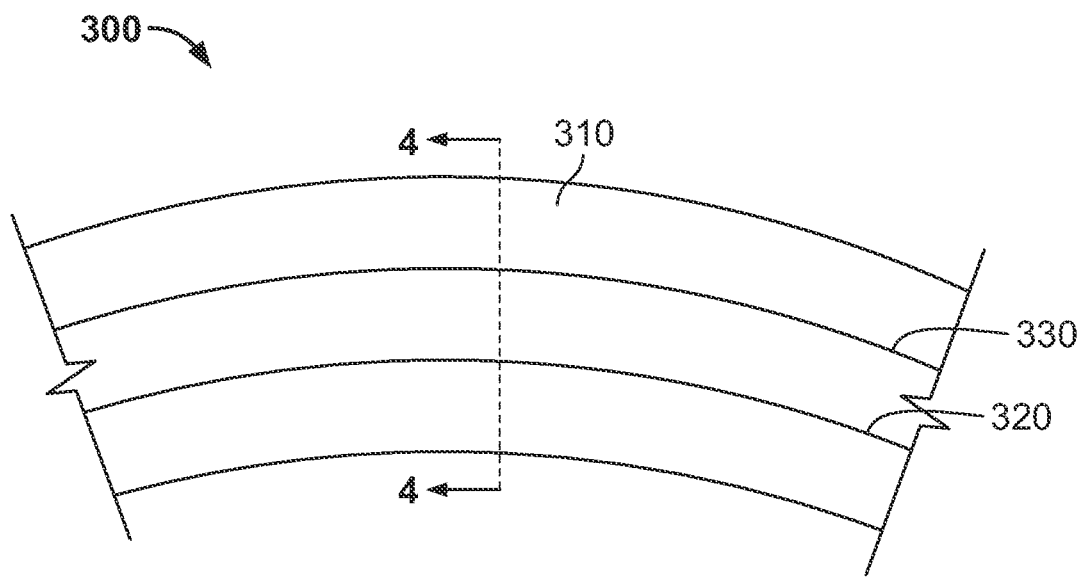
FIG. 3 illustrates a partial side cross-sectional view of one embodiment of a tire 300.

FIG. 3 illustrates a partial side cross-sectional view of one embodiment of a tire 300. In this illustration, only a crown region 310 of the tire is shown. The tire 300 may be a pneumatic or a non-pneumatic tire. The tire 300 may be a composite layer tire, constructed in the manner described above. Alternatively, the tire 300 may be constructed using other tire construction methods.

In the illustrated cross-section, the crown region 310 of the tire 300 includes a first pair of reinforcement rings, including a first lower ring 320 and a first upper ring 330. The first lower ring 320 is coaxial with the first upper ring 330. The first lower ring 320 has a first lower ring diameter, and the first upper ring 330 has a first upper ring diameter. Other upper and lower rings on different layers of the crown region may have the same upper and lower diameters, or the diameters may vary. Exemplary cross-sections of selected embodiments of the crown region 310 of tire 300 are illustrated in FIGS. 4A-4D.

Figure 4A:
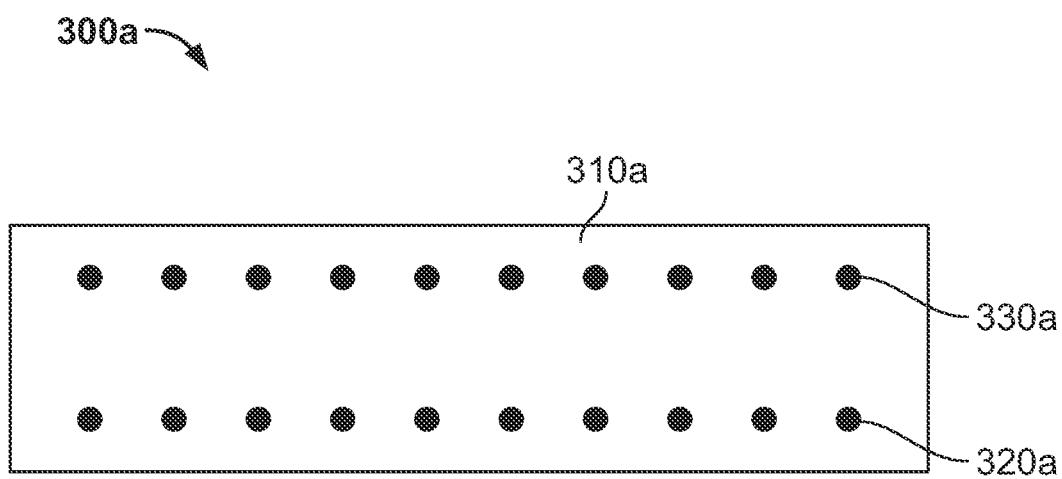
FIG. 4A-4D illustrate circumferential cross-sectional views of crown regions of alternative embodiments of the tire 300.

FIG. 4A illustrates a circumferential cross-sectional view of a crown region 310a of one embodiment of the tire 300a. In the illustrated embodiment, lower rings 320a and upper rings 330a define a shear element. Each lower ring 320a has substantially the same lower ring diameter, and each upper ring 330a has substantially the same upper ring diameter. Therefore, a radial distance between the lower rings 320a and the upper rings 330a is constant along an axial width of the tire.

Figure 4B:
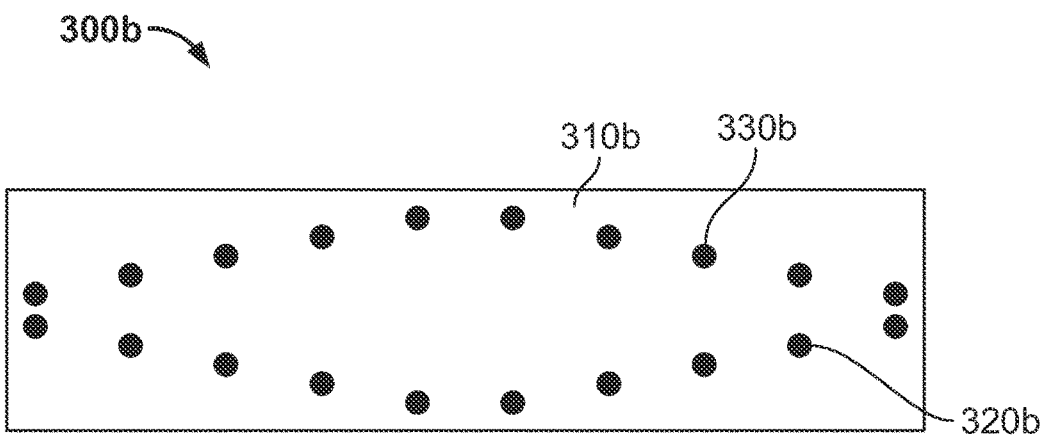

FIG. 4B illustrates a circumferential cross-sectional view of a crown region 310b of an alternative embodiment of the tire 300b. In the illustrated embodiment, lower rings 320b and upper rings 330b define a shear element. The lower ring at the equatorial plane of the tire has the smallest lower ring diameter, and the lower rings at the axial outer ends of the shear element have the greatest lower ring diameters. The lower ring diameters from the equatorial plane towards the outer ends of the shear element increase linearly, such that the lower rings form a "V" shape.

By contrast, the upper ring at the equatorial plane of the tire has the greatest upper ring diameter, and the upper rings at the axial outer ends of the shear element have the smallest upper ring diameters. The upper ring diameters from the equatorial plane towards the outer ends of the shear element decrease linearly, such that the lower rings form an inverted "V" shape. Together, the lower rings 320b and the upper rings 330b form a substantially diamond shape. Therefore, a radial distance between the lower rings 320b and the upper rings 330b varies along an axial width of the tire.

Figure 4C:
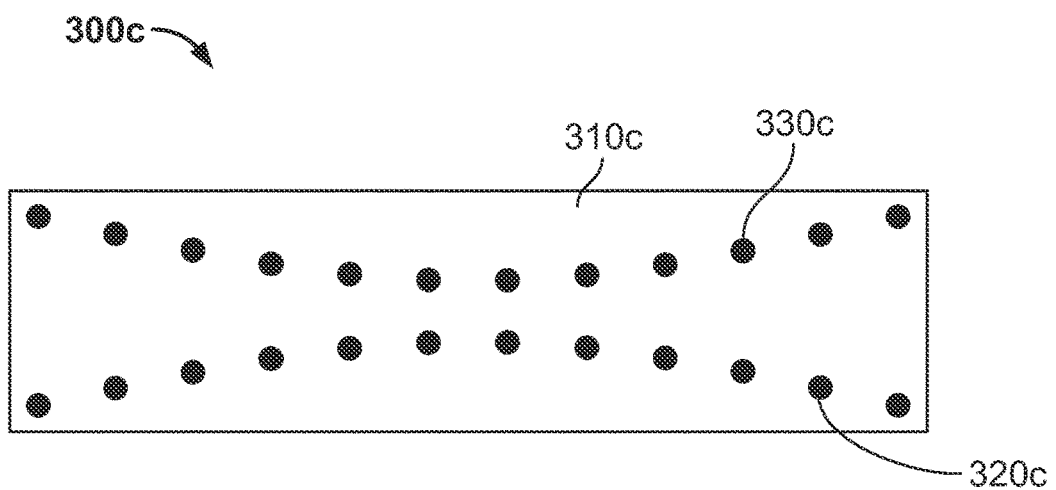

FIG. 4C illustrates a circumferential cross-sectional view of a crown region 310c of another alternative embodiment of the tire 300c. In the illustrated embodiment, lower rings 320c and upper rings 330c define a shear element. The lower ring at the equatorial plane of the tire has the greatest lower ring diameter, and the lower rings at the axial outer ends of the shear element have the smallest lower ring diameters. The lower ring diameters from the equatorial plane towards the outer ends of the shear element decrease linearly, such that the lower rings form an inverted "V" shape.

By contrast, the upper ring at the equatorial plane of the tire has the smallest upper ring diameter, and the upper rings at the axial outer ends of the shear element have the greatest upper ring diameters. The upper ring diameters from the equatorial plane towards the outer ends of the shear element increase linearly, such that the lower rings form a "V" shape. Together, the lower rings 320c and the upper rings 330c form an "X" shape. Therefore, a radial distance between the lower rings 320c and the upper rings 330c varies along an axial width of the tire.

Figure 4D:
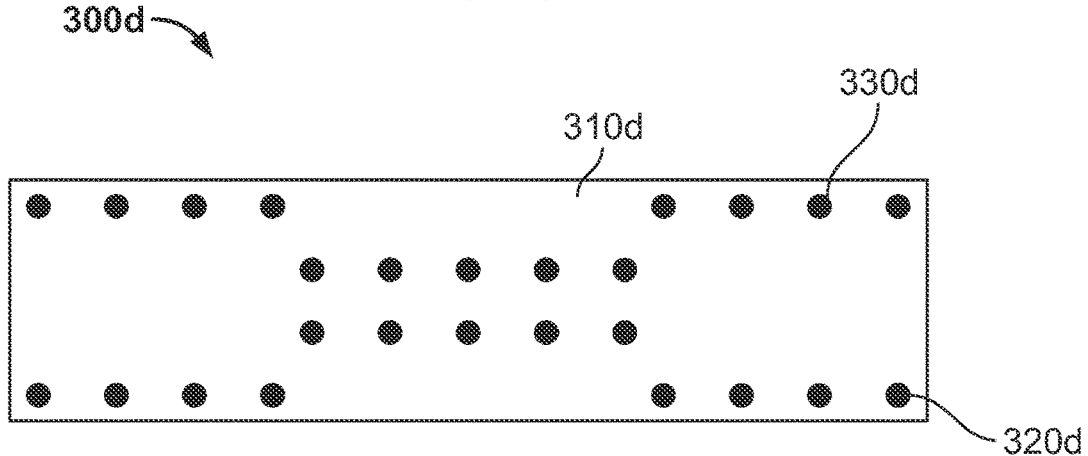

FIG. 4D illustrates a circumferential cross-sectional view of a crown region 310d of yet another alternative embodiment of the tire 300d. In the illustrated embodiment, lower rings 320d and upper rings 330d define a shear element. A plurality of lower rings near the equatorial plane of the tire have a first lower ring diameter, and the remaining lower rings have a second lower ring diameter that is smaller than the first lower ring diameter.

By contrast, a plurality of upper rings near the equatorial plane of the tire have a first upper ring diameter, and the remaining upper rings have a second upper ring diameter that is greater than the first upper ring diameter. Together, the lower rings 320d and the upper rings 330d form a stepped shape. Therefore, a radial distance between the lower rings 320d and the upper rings 330d varies along an axial width of the tire.

It should be understood that the exemplary embodiments of shear elements shown in FIGS. 4A-4D only represent a small number of possible geometries. In alternative embodiments, any number of geometries may be employed. For example, while the illustrated embodiments show shear elements having linear boundaries, one or more boundaries of a shear element may be curved. Additionally, while the illustrated embodiments show shear elements that are substantially symmetric about an equatorial plane of the tire, in other alternative embodiments, the shear element may be asymmetric. Further, while the illustrated embodiments show shear elements formed by a plurality of lower rings and upper rings, any number of intermediate rings may be disposed between the lower rings and upper rings. Finally, while the shear elements of FIGS. 4A-4D are depicted as a plurality of rings, in alternative embodiments (not shown), the shear elements are formed by a plurality of membranes.

Figure 5:
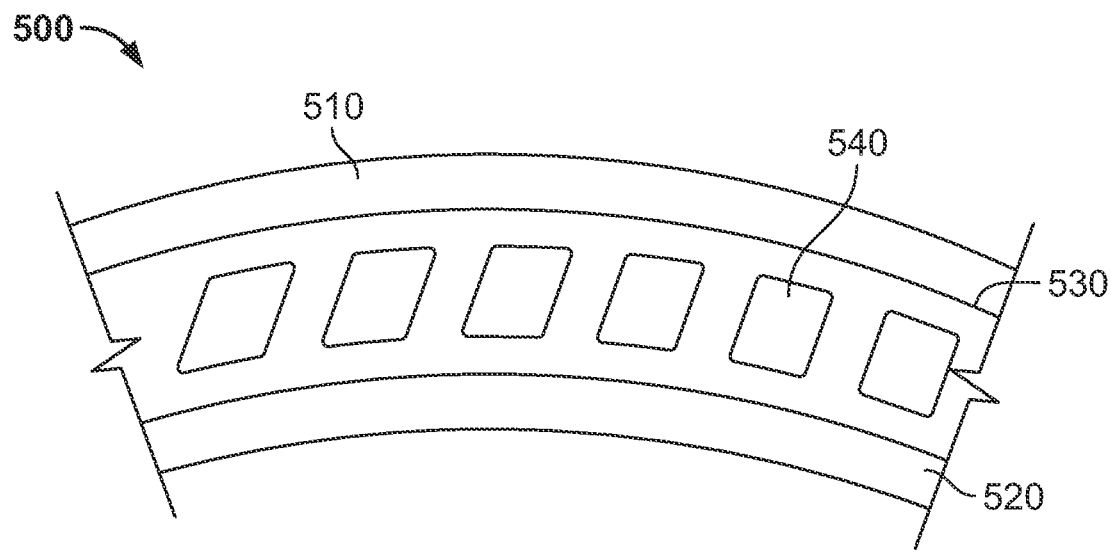
FIG. 5 illustrates a partial side cross-sectional view of an alternative embodiment of a tire.

FIG. 5 illustrates a partial side cross-sectional view of one embodiment of a tire 500. In this illustration, only a crown region 510 of the tire is shown. The tire 500 may be a pneumatic or a non-pneumatic tire. The tire 500 may be a composite layer tire, constructed in the manner described above. Alternatively, the tire 500 may be constructed using other tire construction methods.

In the illustrated cross-section, the crown region 510 of the tire 500 includes a first pair of reinforcement rings, including a first lower ring 520 and a first upper ring 530. Together, the lower rings and upper rings define a shear element. The first lower ring 520 is coaxial with the first upper ring 530. The first lower ring 520 has a first lower ring diameter, and the first upper ring 530 has a first upper ring diameter. Other upper and lower rings in the crown region may have the same upper and lower diameters, or the diameters may vary. For example, the shear element may have any of the cross-sections illustrated in FIGS. 4A-4D. Alternatively, the cross section of the shear element may have any geometric shape. In other alternative embodiments (not shown), any number of intermediate rings may be disposed between the lower rings and upper rings. In still other alternative embodiments (not shown), the shear elements are formed by a plurality of membranes.

A plurality of voids 540 are disposed between the lower rings 520 and the upper rings 530. In the illustrated embodiment, each of the voids 540 has a substantially parallelogram-shaped cross-section. Additionally, each of the voids 540 is substantially the same size. In alternative embodiments (not shown), the voids may be triangular, pentagonal, hexagonal, octagonal, circular, oval, or have any geometric shape. In other alternative embodiments (not shown), the voids may have a variety of sizes.

In one embodiment, the voids 540 have a consistent cross-section in the axial direction of the tire, and extend across the entire axial width of the shear element. In an alternative embodiment, the voids may have a variable cross-section. In another alternative embodiment, the voids only extend across a portion of the axial width of the shear element. In such an embodiment, the voids may be staggered at different axial locations.

When a tire is cured at high temperatures and pressures, the green rubber may flow during the curing process. However, if the tire is cured at lower temperatures or lower pressures, the voids may maintain their shape during the curing process. For example, the tire may be cured in an autoclave at a lower pressure than would be provided during a curing process in a tire vulcanization mold. In one embodiment, the tire is cured at a temperature between 38° C. to 260° C. (100° F. to 500° F.) and at a pressure between 0.10 mPa to 0.70 mPa (15 PSI to 100 PSI). However, it should be understood that the tire may be cured at other temperatures and pressures.

Figure 6:
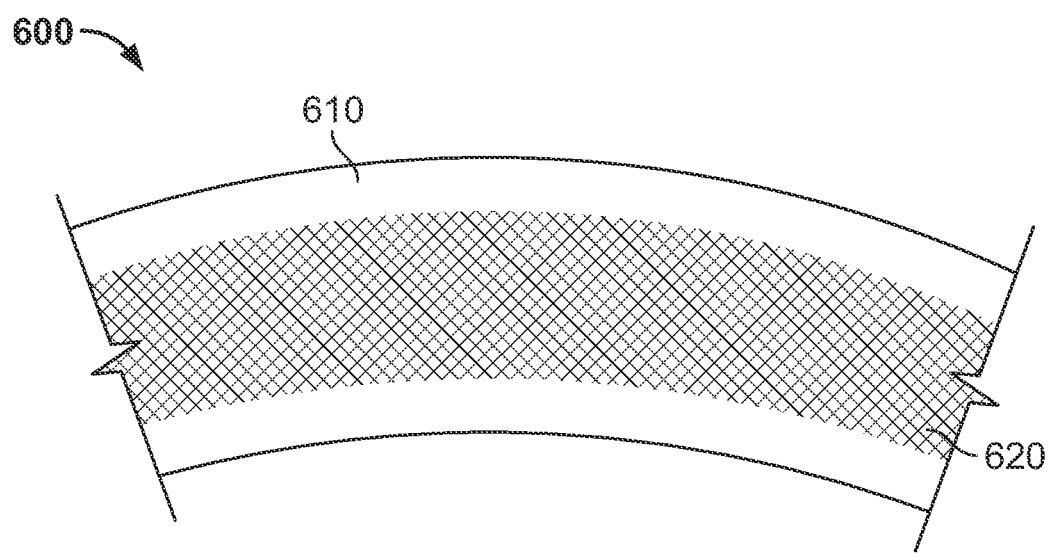
FIG. 6 illustrates a partial side cross-sectional view of another alternative embodiment of a tire.

FIG. 6 illustrates a partial side cross-sectional view of one embodiment of a tire 600. In this illustration, only a crown region 610 of the tire is shown. The tire 600 may be a pneumatic or a non-pneumatic tire. The tire 600 may be a composite layer tire, constructed in the manner described above. Alternatively, the tire 600 may be constructed using other tire construction methods.

In the illustrated cross-section, the crown region 610 of the tire 600 includes a reinforcement mesh 620. The reinforcement mesh 620 provides additional stiffness in both tension and compression. This may be advantageous in tires that are designed to carry some or all of a load in tension, as well as in tires that are designed to carry some or all of a load in compression. Where the tire 600 is a composite layer tire, the reinforcement mesh 620 may be sandwiched between adjacent layers of polymeric material.

In one embodiment, the reinforcement mesh 620 has a consistent cross-section in the axial direction of the tire. In an alternative embodiment, the mesh may have a variable cross-section. For example, the mesh may have a cross-section corresponding to those illustrated in FIGS. 4A-4D. Alternatively, the cross section of the mesh may have any geometric shape.

Figure 7:
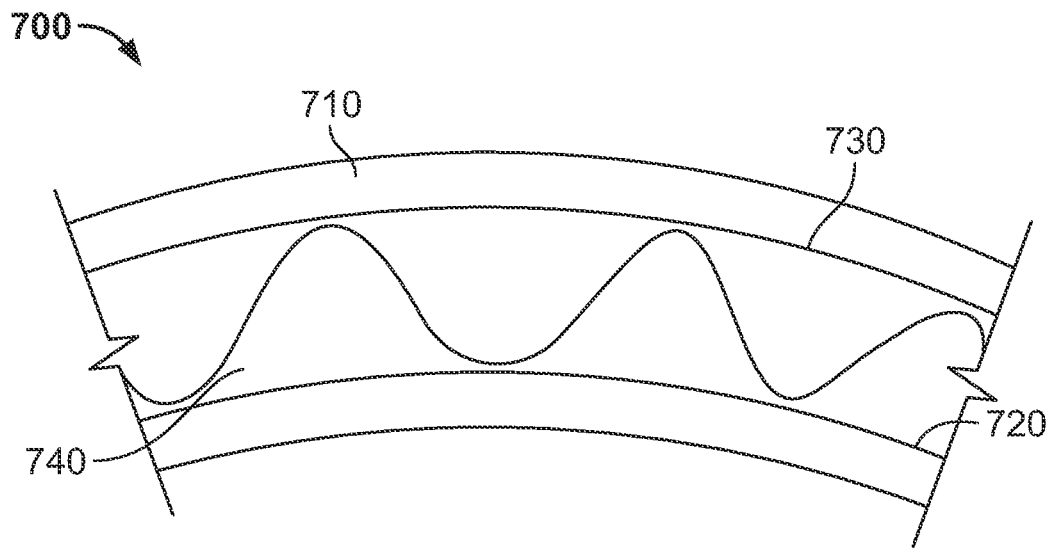
FIG. 7 illustrates a partial side cross-sectional view of yet another alternative embodiment of a tire.

FIG. 7 illustrates a partial side cross-sectional view of another embodiment of a tire 700. In this illustration, only a crown region 710 of the tire is shown. The tire 700 may be a pneumatic or a non-pneumatic tire. The tire 700 may be a composite layer tire, constructed in the manner described above. Alternatively, the tire 700 may be constructed using other tire construction methods.

In the illustrated cross-section, the crown region 710 of the tire 700 includes a first pair of reinforcement rings, including a first lower ring 720 and a first upper ring 730. Together, the lower rings and upper rings define a shear element. The first lower ring 720 is coaxial with the first upper ring 730. The first lower ring 720 has a first lower ring diameter, and the first upper ring 730 has a first upper ring diameter. Other upper and lower rings in the crown region may have the same upper and lower diameters, or the diameters may vary. For example, the shear element may have any of the cross-sections illustrated in FIGS. 4A-4D. Alternatively, the cross section of the shear element may have any geometric shape. In still other alternative embodiments (not shown), the shear elements are formed by a plurality of membranes.

An additional reinforcement 740 is disposed between the first lower ring 720 and the first upper ring 730. In the illustrated embodiment, the additional reinforcement 740 is disposed in a wave formation that oscillates between the first lower ring 720 and the first upper ring 730. In an alternative embodiment (not shown), the additional reinforcement is an annular ring disposed between the first lower ring and the first upper ring. In other alternative embodiments, the additional reinforcement may follow any path.

In the case of a composite layer tire, an additional reinforcement 740 may be placed on each polymeric sheet of material. Alternatively, the additional reinforcement may only be placed on selected sheets. In one embodiment, the additional reinforcement follows the same path on each sheet. In an alternative embodiment, the additional reinforcements on different sheets have different paths. For example, in one known embodiment, each additional reinforcement has substantially the same wave shape, but the additional reinforcement on one sheet is rotated with respect to the additional reinforcement on an adjacent sheet.

Figure 8:
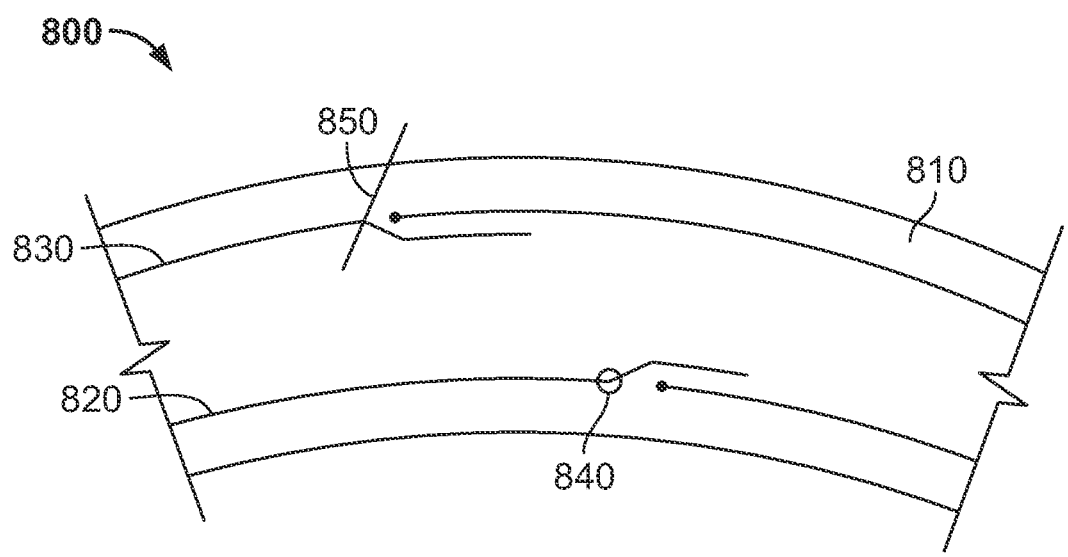
FIG. 8 illustrates a partial side cross-sectional view of still another alternative embodiment of a tire.

FIG. 8 illustrates a partial side cross-sectional view of another embodiment of a tire 800. In this illustration, only a crown region 810 of the tire is shown. The tire 800 is a composite layer tire, constructed in the manner described above. The tire 800 may be a pneumatic or a non-pneumatic tire.

In the illustrated cross-section, the crown region 810 of the tire 800 includes a pair of reinforcement cords, including a lower cord 820 and an upper cord 830. Together, the lower cords and upper cords define a shear element. Both the lower and upper cords 820, 830 are placed on a polymeric sheet in a substantially circular formation such that the lower cord 820 is coaxial with the upper cord 830.

A lower hole 840 is formed in the polymeric sheet at a location along the path of the lower cord 820. The lower cord 820 may be threaded through lower hole 840 of the polymeric sheet, such that the lower cord 820 is disposed on both sides of the polymeric sheet. Adjacent sheets (not shown) may also have lower holes, so that the lower cord 820 is threaded through multiple sheets of the composite tire 800. In one embodiment, the lower cord 820 is threaded through every polymeric sheet of the composite tire 800.

In one embodiment, the lower hole 840 is pre-formed on the polymeric sheet. In an alternative embodiment, the lower hole is formed during the construction of the composite layer tire 800. In one such embodiment, the lower hole is formed by puncturing the polymeric sheet with the lower cord 820. In an alternative embodiment, the lower hole is formed by a separate tool.

An upper slit 850 is disposed in the polymeric sheet at a location along the path of the upper cord 830. The upper cord 830 may be threaded through upper slit 850 of the polymeric sheet, such that the upper cord 830 is disposed on both sides of the polymeric sheet. Adjacent sheets (not shown) may also have upper slits, so that the upper cord 840 is threaded through multiple sheets of the composite tire 800. In one embodiment, the upper cord 830 is threaded through every polymeric sheet of the composite tire 800.

In one embodiment, the upper slit 850 is pre-formed on the polymeric sheet. In an alternative embodiment, the upper slit is formed during the construction of the composite layer tire 800. In one such embodiment, the upper slit is formed by puncturing the polymeric sheet with the upper cord 830. In an alternative embodiment, the upper slit is formed by a separate tool.

While the illustrated embodiment shows a lower hole 840 and an upper slit 850, it should be understood that any type of opening may be formed in either location. For example, the polymeric sheet may include an upper and lower hole, or an upper and lower slit.

The upper and lower cords may be threaded through the polymeric sheets to form a shear element having any geometry. For example, the shear element may have any of the cross-sections illustrated in FIGS. 4A-4D.

The composite tire 800 of FIG. 8 may be further modified to include other features. For example, the composite tire may include voids between the upper and lower cords, such as the voids 540 shown in FIG. 5, or the alternative voids discussed above. Additionally, the composite tire may include additional reinforcements between the upper and lower cords, such as the additional reinforcement 740 shown in FIG. 7, or the alternative reinforcements discussed above.

Figure 9:
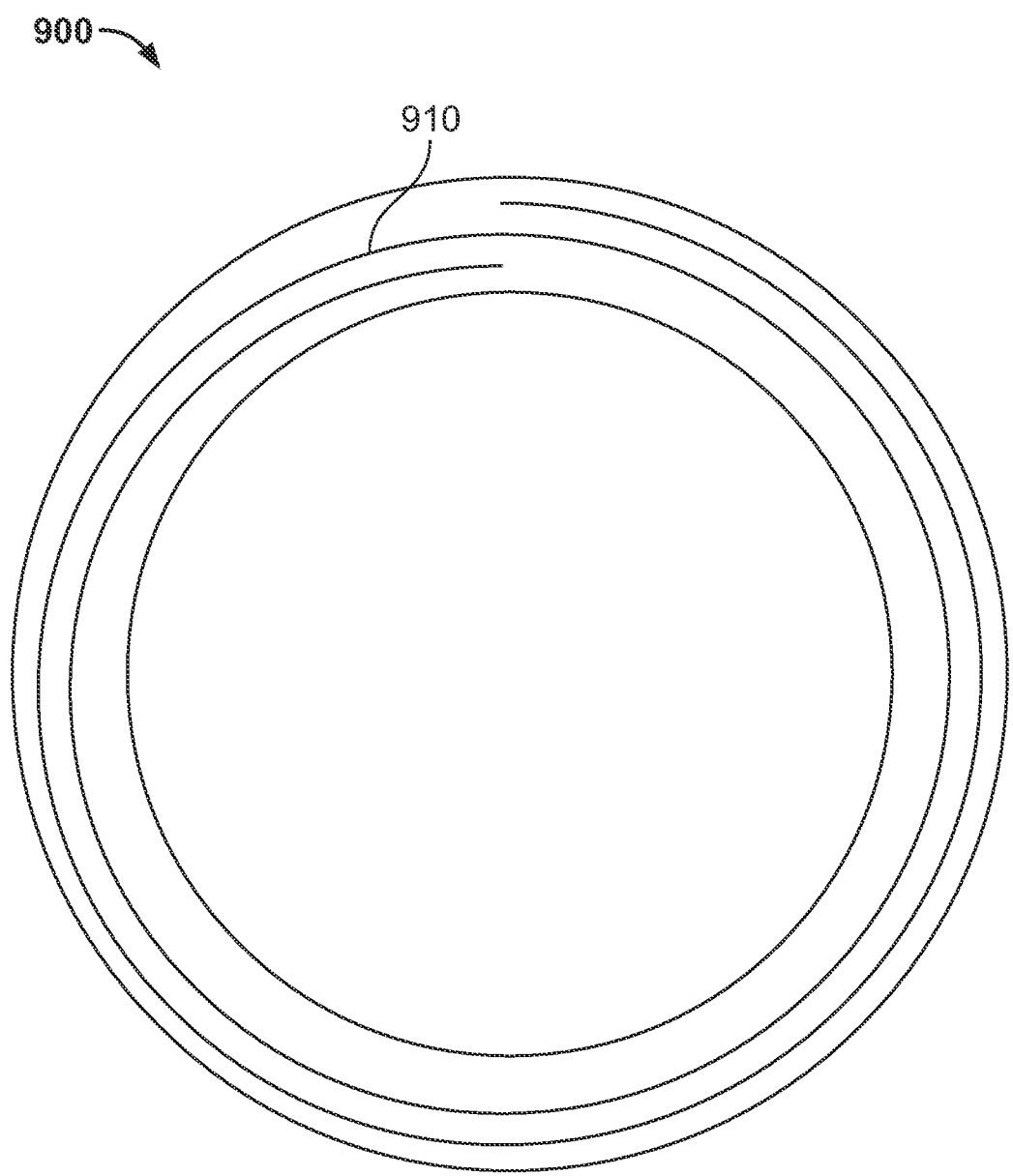
FIG. 9 illustrates a side cross-sectional view of yet another alternative embodiment of a tire.

FIG. 9 illustrates a side cross-sectional view of yet another alternative embodiment of a tire 900. The tire 900 may be a pneumatic or a non-pneumatic tire. The tire 900 may be a composite layer tire, constructed in the manner described above. Alternatively, the tire 900 may be constructed using other tire construction methods.

The tire 900 includes a spiral reinforcement 910. The spiral reinforcement 910 is a single reinforcement that is wrapped around itself. For example, in a composite layer construction, the spiral reinforcement is a cord that is placed on a polymeric sheet of material. In one embodiment, the cord is pre-formed in a spiral configuration. In an alternative embodiment, the cord is wound about the polymeric sheet as it is being placed. Multiple sheets of polymeric material may have spiral reinforcements. When the tire is cured, the spiral reinforcement defines both the upper and lower layers of a shear element.

In an alternative embodiment, a spiral reinforcement may be wound about a tire made by a traditional tire construction process. For example, an inextensible membrane may be coextruded with an elastic material to form a sheet having a single extensible layer and a single inextensible layer. The sheet may be then wrapped around a partially built tire multiple times to form multiple layers of inextensible material.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

What is claimed is:

1. A tire comprising:
   a central region configured to be mounted to a wheel;
   a crown region including a circumferential tread and a shear element disposed below the circumferential tread;
      wherein the shear element includes an upper reinforcement layer that includes a plurality of upper rings that are layered in an axial direction of the tire, a lower reinforcement layer that includes a plurality of lower rings that are layered in an axial direction of the tire, and an elastic region disposed between the upper reinforcement layer and the lower reinforcement layer, and
      wherein a radial distance between the upper reinforcement layer and the lower reinforcement layer varies along an axial width of the tire; and
   an intermediate region extending from the central region to the crown region.

2. The tire of claim 1, wherein the radial distance between the upper reinforcement layer and the lower reinforcement layer at axial outer ends of the tire is greater than the radial distance between the upper reinforcement layer and the lower reinforcement layer at an equatorial plane of the tire.

3. The tire of claim 1, wherein the tire is a non-pneumatic tire.

4. The tire of claim 1, wherein the tire is a composite layer tire.

5. The tire of claim 1, wherein the shear element has linear boundaries.

6. The tire of claim 1, wherein the shear element is substantially symmetric about an equatorial plane of the tire.

7. A tire comprising:
   a central region configured to be mounted to a wheel,
   a crown region including a circumferential tread, a plurality of lower rings that are layered in an axial direction of the tire, and a plurality of upper rings that are layered in the axial direction of the tire,
      wherein at least one of the plurality of lower rings and the plurality of upper rings has rings with different diameters, and
   an intermediate region extending from the central region to the crown region.

8. The tire of claim 7, wherein a radial distance between the plurality of upper rings and the plurality of lower rings at axial outer ends of the tire is greater than a radial distance between the plurality of upper rings and the plurality of lower rings at an equatorial plane of the tire.

9. The tire of claim 7, wherein the plurality of upper rings and the plurality of lower rings define a shear element.

10. The tire of claim 9, wherein the shear element has linear boundaries.

11. The tire of claim 9, wherein the shear element is substantially symmetric about an equatorial plane of the tire.

12. The tire of claim 7, wherein the tire is a composite layer tire.

13. A tire comprising:
   a central region configured to be mounted to a wheel;
   a crown region including a shear element disposed below a circumferential tread, the shear element having a radial thickness that varies along an axial width of the tire, the shear element including a plurality of lower rings that are layered in an axial direction of the tire and a plurality of upper rings that are layered in the axial direction of the tire; and an intermediate region extending from the central region to the crown region.

14. The tire of claim 13, wherein a radial distance between the plurality of upper rings and the plurality of lower rings at axial outer ends of the tire is greater than the radial distance the plurality of upper rings and the plurality of lower rings at an equatorial plane of the tire.

15. The tire of claim 13, wherein the tire is one of a pneumatic tire, a non-pneumatic tire, and a composite layer tire.

* * * * *